United States Patent [19]

Smith

[11] 4,195,652
[45] Apr. 1, 1980

[54] LIQUID LEVEL CONTROL FOR A TRANSMISSION SUMP

[75] Inventor: Lyle B. Smith, Westland, Mich.

[73] Assignee: General Motors Corporation, Detroit, Mich.

[21] Appl. No.: 893,470

[22] Filed: Apr. 3, 1978

[51] Int. Cl.$^2$ .............................................. B67D 3/00
[52] U.S. Cl. ..................................... 137/43; 137/453; 137/205
[58] Field of Search ................... 137/453, 454, 38, 43, 137/205

[56] References Cited

U.S. PATENT DOCUMENTS

| | | | |
|---|---|---|---|
| 1,909,836 | 5/1933 | Kline | 137/453 X |
| 1,972,962 | 9/1934 | Weber | 137/454 |
| 2,207,527 | 7/1940 | Weber | 137/453 X |
| 3,703,716 | 11/1972 | Moore | 137/434 X |

FOREIGN PATENT DOCUMENTS 1069380  2/1954  France ...................................... 137/453

Primary Examiner—Alan Cohan
Attorney, Agent, or Firm—Donald F. Scherer

[57] ABSTRACT

A liquid level control for a transmission sump wherein excess fluid is stored in an external reservoir. The external reservoir is connected to a vacuum source, such as the engine manifold, above the liquid level in the external reservoir. The external reservoir is connected through a passage to the transmission sump. The passage is connected to the external reservoir at a position above the liquid level, such that the vacuum in the external reservoir can be imposed upon the passage and terminates in the transmission sump at the desired level. The vacuum is thus transmitted to the transmission sump to withdraw liquid when the level therein is above the desired level whereby the sump liquid level is determined at a substantially constant level dependent upon the position of the passage in the transmission sump. If the sump level is below the passage terminus, fluid enters the sump, from the external reservoir, through a fill passage connected at the bottom of the external reservoir.

1 Claim, 2 Drawing Figures

LIQUID LEVEL CONTROL FOR A TRANSMISSION SUMP

This invention relates to liquid level controls and more particularly to liquid level controls for a transmission sump wherein an optimum liquid is desired and wherein excess liquid is stored in an external reservoir.

It is an object of this invention to provide an improved liquid level control wherein the liquid level in a sump is maintained at a substantially constant level through an external reservoir by application of a vacuum to the external reservoir thereby withdrawing liquid from the sump when the desired level is exceeded and by a return passage from the external reservoir to the sump which permits liquid to flow into the sump when the liquid level therein is below the desired level.

It is another object of this invention to provide an improved liquid level control for a transmission sump wherein the liquid level in the transmission sump or reservoir is maintained at a desired level by using an external reservoir for withdrawing or replenishing the liquid in the transmission sump via separate passages and wherein the liquid in the withdrawing passage is subjected to subatmospheric pressure when the liquid level in the transmission sump is above the desired level.

These and other objects and advantages of the present invention will be more apparent from the following description and drawings in which.

Figure 1:
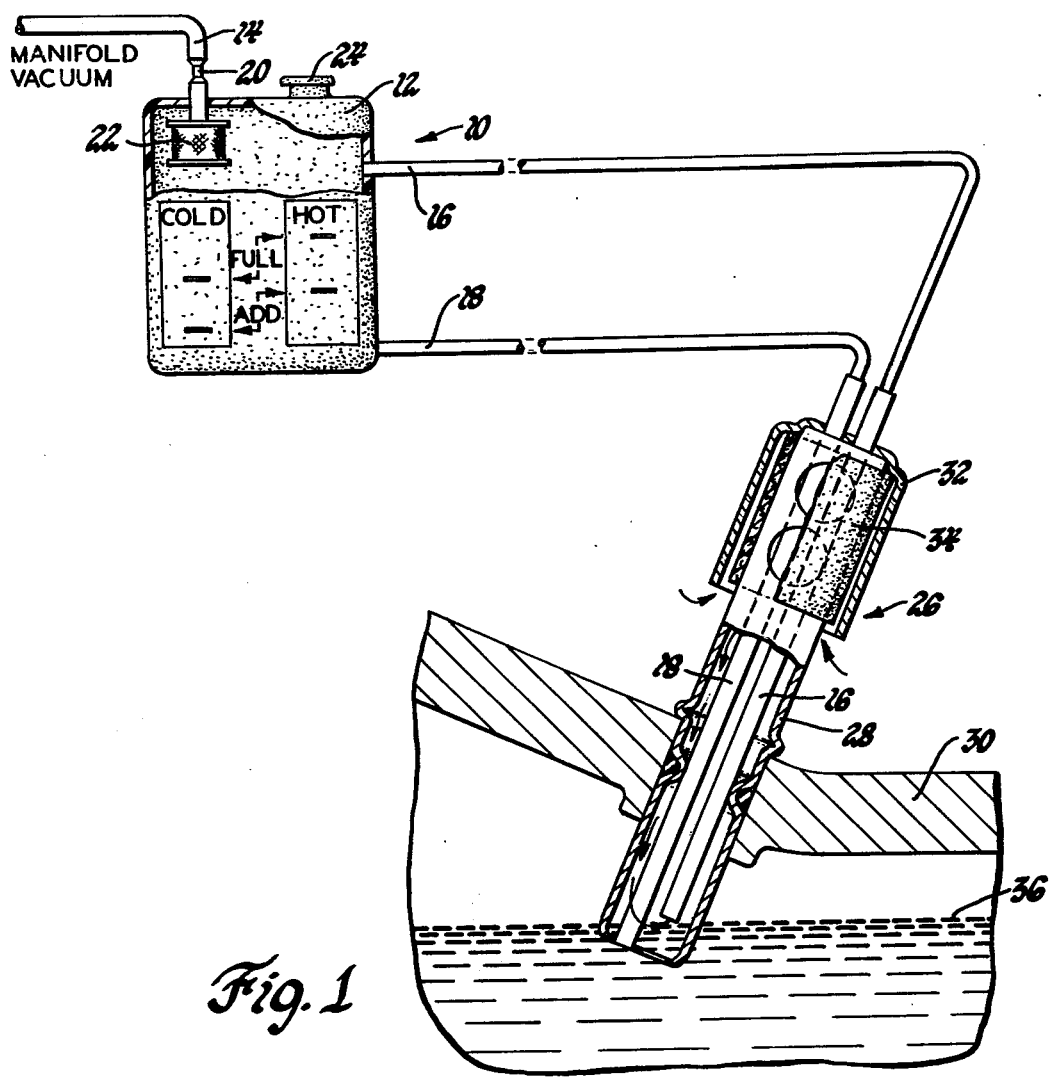
FIG. 1 is a diagrammatic representation of a liquid level control system.

Referring to the drawings, wherein like characters represent the same or corresponding components, there is shown an external reservoir 10 comprised of a container 12 which has connected thereto an engine manifold vacuum passage 14, a vacuum passage 16 and a replenishing or return passage 18. The engine manifold vacuum passage 14 has one end connected to an engine manifold, not shown, the other end affixed to a filter 22 and a restriction 20 formed between the ends. The filter 22 is designed to freely pass air through the filter but will not permit the passage of liquid. The container 12 has a removable cap 24 which permits the introduction of liquid into the container and also has embossed thereon indicia indicating hot and cold conditions and markings thereunder which indicate when it is necessary to add liquid to the container and when the container is full under the respective conditions. The passages 16 and 18 are connected to a transmission fill and withdrawal tube generally designated 26 which is comprised of a tubular member 28 secured in a transmission housing 30, an end cover 32 in which is secured the passages 16 and 18, and an air filter 34 disposed between the end cover 32 and the tubular member 28. The vacuum passage 16 extends into the transmission housing and terminates at a predetermined level above the bottom of the transmission sump or reservoir. The passage 18 also extends into the transmission housing and terminates at a position preferably slightly below that of the vacuum passage 16.

During operation of the engine, not shown, a vacuum is applied to passage 14. This vacuum is also imposed on the container 12 and transmitted through passage 16 to the transmission sump. If the fluid in the transmission sump is above the level 36, shown in FIG. 1, the excess fluid in the sump will be drawn through passage 16 to the reservoir 10. If the fluid level is below that indicated at 36, atmospheric air will be drawn into the passage 16 and on into the reservoir 10. Air to replenish the air in the transmission case will pass through the filter 34 and the tube 28 into the transmission case. The air, in passage 16, will pass through the reservoir 10 into the engine manifold. The purpose of restriction 20 is to limit the flow rate of the air from the transmission case to the engine manifold so as not to affect the desired air/fuel ratio of the engine. When air is flowing through the passage 16, the pressure at the transmission end of passage 18 and the air within the container 12 will be substantially equal such that liquid will be permitted to flow from the container 12 through passage 18 to the transmission until level 36 is reached therein. At this time, a seal is created at the lower end of passage 16 such that a vacuum will be created until the level 36 is sufficient to provide enough air flow through passage 16 to satisfy the requirements of restriction 20 such that a vacuum will be created in the container 12 above liquid level therein to prevent liquid flow in passage 18.

Obviously, when the vehicle engine is not operative, the liquid in container 12 is drained to the transmission sump, through passage 18, due to the pressure equalization that will occur. However, upon start-up of the engine, the excess liquid in the transmission sump will be drawn into the container 12 until the desired level 36 is reached in the transmission sump.

Figure 2:
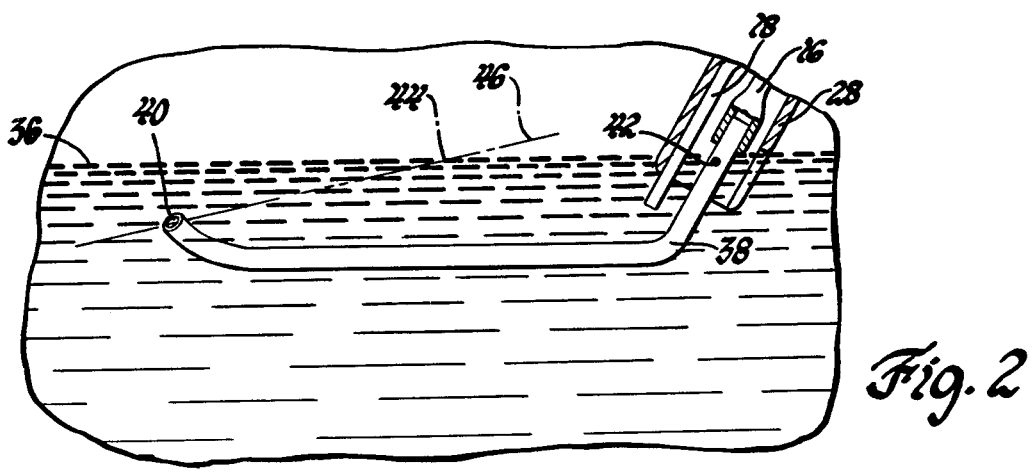
FIG. 2 is a modification of a portion of the system shown in FIG. 1.

In FIG. 2, there is shown a modification of the level control system shown in FIG. 1. The modification includes an equalizer tube 38, which extends from the vacuum passage 16 into the transmission sump and ends at 40 in a position below the level 36. The equalizer tube 38 has a through-hole or passage 42 drilled therein at the desired liquid level 36. The purpose of the equalizer tube 38 is to prevent the liquid level in the transmission sump from decreasing below the desired level 36 when the vehicle is on an incline or during acceleration or deceleration of the vehicle. The main objective in maintaining a desired liquid level in a transmission sump is so that the control pump in the transmission will not be deprived of oil under various operating conditions. The optimum level depends upon the position of the pump inlet, which is located in the transmission sump.

For the purpose of this disclosure, it is considered in FIG. 2, that the position of the pump inlet is located below the point 44 on surface 36. Assuming that end 40 of tube 38 is positioned toward the forward end of the vehicle and the vehicle is on an upgrade, the liquid level in the transmission sump will be angled relative to the transmission sump and may attain the position shown by line 46. When the angle of liquid level in the transmission sump reaches line 46, the end 40 of equalizer tube 38 will be open to air within the transmission sump such that the passage 16 will be drawing air instead liquid, such that further decrease in liquid level of the transmission sump cannot occur since replenishing via tube 18 will occur if the liquid level drops below end 40 of equalizer tube 38. If the vehicle is located on a downgrade, the liquid level 36 will attempt to angle in a direction opposite to the angle shown at 46 whereby passage 42 will be open to the atmospheric pressure in tube 28 and again the vacuum passage 16 will be withdrawing air rather than liquid from the transmission such that a further reduction of the liquid level cannot occur.

Thus, it can be seen that the modification shown in FIG. 2 operates in the same manner as the system shown in FIG. 1, with the exception that the angular attitude of the transmission is taken into account by the control system.

Obviously, many modifications and variations are possible in light of the above teachings. It is, therefore, to be understood that within the scope of the appended claims, the invention may be practiced otherwise than is specifically described.

The embodiments of the invention in which an exclusive property or privilege is claimed are defined as follows:

1. A transmission liquid level control comprising; a transmission sump having a desired liquid level during operation; an external storage reservoir means for storing excess liquid; a source of subatmospheric pressure connected with said external reservoir and imposing a subatmospheric pressure thereon during transmission operation; passage means interconnecting said transmission sump and said external reservoir including a level control passage extending from a terminus at the desired liquid level in the transmission sump to a terminus above the liquid level in said external reservoir for imposing a subatmospheric pressure on said passage to enforce the transfer of liquid from said transmission sump to said external reservoir when the liquid level in said transmission sump is above the desired level, a return passage connected between said external reservoir and said transmission sump at a position below both the liquid level in said external reservoir and the desired level in said transmission sump to permit the flow of liquid from said external reservoir to said transmission sump when the liquid level in said transmission sump is below the desired level, and air passage means surrounding said level control passage and said return passage for connecting said level control passage with atmospheric air when the liquid level in said transmission sump is below said desired level; an equalizer tube extending from the terminum of said level control at the desired liquid level to a position spaced therefrom having an open end at the spaced position below the desired liquid level and an aperture in said equalizer tube at the terminus of said level control to communicate said desired level to said level control passage; and flow restriction means disposed between said source of subatmospheric pressure and said external reservoir to limit the rate of air withdrawal from said external reservoir.

* * * * *